US007761318B2

(12) United States Patent (10) Patent No.: US 7,761,318 B2
Olson et al. (45) Date of Patent: Jul. 20, 2010

(54) SYSTEM AND METHOD FOR BILLING A CONSTRUCTION ACTIVITY FOR A TELECOMMUNICATIONS COMPANY

(75) Inventors: Traci Olson, Olathe, KS (US); Brian Hattaway, Lenexa, KS (US); Guy Bower, Avon Park, FL (US)

(73) Assignee: Embarq Holdings Company, LLC, Overland Park, KS (US)

( * ) Notice: Subject to any disclaimer, the term of this patent is extended or adjusted under 35 U.S.C. 154(b) by 413 days.

(21) Appl. No.: 11/540,215

(22) Filed: Sep. 29, 2006

(65) Prior Publication Data

US 2007/0255656 A1 Nov. 1, 2007

Related U.S. Application Data

(63) Continuation-in-part of application No. 11/411,727, filed on Apr. 26, 2006.

(51) Int. Cl.
*G06F 9/44* (2006.01)
*G06F 9/46* (2006.01)
*G06Q 40/00* (2006.01)

(52) U.S. Cl. .................................. 705/7; 705/8; 705/40
(58) Field of Classification Search ....................... 705/7
See application file for complete search history.

(56) References Cited

U.S. PATENT DOCUMENTS

| 6,961,415 | B2 * | 11/2005 | Doherty et al. | ......... | 379/201.12 |
| 7,117,162 | B1 * | 10/2006 | Seal et al. | ...................... | 705/9 |
| 7,231,354 | B1 * | 6/2007 | Rooks et al. | ................... | 705/1 |
| 2004/0186763 | A1 | 9/2004 | Smith | | |
| 2004/0215633 | A1 | 10/2004 | Harris | | |
| 2005/0289051 | A1 * | 12/2005 | Allin et al. | ..................... | 705/40 |

OTHER PUBLICATIONS

Microsoft Office Project 2003 Inside Out (Teresa Stover, Microsoft Press, Oct. 2003).*
"GCPay Help Text," www.gcpay.com, Nov. 14, 2005.*
"Construction Accounting Software Review—2004" CPA Technology Advisor, Apr.-May 2004.*

(Continued)

*Primary Examiner*—Scott L Jarrett
*Assistant Examiner*—George H Walker
(74) *Attorney, Agent, or Firm*—Sonnenschein Nath & Rosenthal LLP

(57) ABSTRACT

An exemplary method and system for administering a construction activity for a telecommunications company can include designing the activity, transmitting the activity to a second datastore, and communicating the one or more tasks. The first datastore may include an inventory of at least one of one or more tasks and inventory items and the second datastore may provide a communication interface for a first entity managing the activity and a second entity completing the one or more tasks to accomplish the activity at a construction site, where the one or more tasks can be communicated to the second entity. Moreover, the second entity can create a change in plan and communicate the change in plan to the second datastore, which in turn communicates the change in plan to the first datastore. Generally, once the change in plan is approved, a task is completed for the activity. The second entity can communicate the completed task directly to the second datastore, which in turn may populate the first datastore inventory with the completed task.

6 Claims, 8 Drawing Sheets

OTHER PUBLICATIONS

"ToolboxSoftware.com" CPA Technology Advisor, Apr.-May 2005.*

Primavera Expedition—Contract Control Software—User's Guide Version 6.0 Primavera Systems, Inc., 1998.*

"Microsoft Office Project 2003 Inside Out" Teresa Stover, Microsoft Press (Introductory Material, Chapter 9, Chapter 30), Oct. 2003. (78 pages).

"Primavera Project Planner®, Planning and Control Guide, Version 3.0" Primavera Systems, Inc., 1999. (300 pages).

Non-Final Rejection date mailed Mar. 18, 2009 in U.S. Appl. No. 11/411,727.

Response filed Jun. 12, 2009 to Non-Final Rejection date mailed Mar. 18, 2009 in U.S. Appl. No. 11/411,727.

Final Rejection Date mailed Aug. 18, 2009 in U.S. Appl. No. 11/411,727.

Non-Final Rejection date mailed Mar. 27, 2009 in U.S. Appl. No. 11/540,163.

Response filed Jun. 12, 2009 to Non-Final Rejection date mailed Mar. 27, 2009 in U.S. Appl. No. 11/540,163.

Final Rejection date mailed Aug. 18, 2009 in U.S. Appl. No. 11/540,163.

Response filed Sep. 22, 2009 to Final Rejection dated Aug. 18, 2009 in U.S. Appl. No. 11/540,163.

Advisory Action date mailed Oct. 23, 2009 in U.S. Appl. No. 11/540,163.

RCE/Amendment filed Dec. 15, 2009 2009 in U.S. Appl. No. 11/540,163.

Examiner Interview Summary date mailed Jan. 20, 2010 2009 in U.S. Appl. No. 11/540,163.

* cited by examiner

SYSTEM AND METHOD FOR BILLING A CONSTRUCTION ACTIVITY FOR A TELECOMMUNICATIONS COMPANY

CROSS-REFERENCE TO RELATED APPLICATIONS

This is a continuation-in-part application of prior U.S. patent application Ser. No. 11/411,727, filed 26 Apr. 2006. The entirety of this aforementioned application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to an activity, and more particularly, but not by way of limitation, to a system and method of administering a construction activity for a telecommunications company.

BACKGROUND OF THE INVENTION

Often, organizations initiate activities, such as projects, outside their property by utilizing their employees or hiring a contractor. During the project, material may be installed at the worksite that is inventoried by the organization initiating the project. Generally, organizations, such as telecommunication companies or utilities, track this outside inventory, such as lines, towers and other equipment, for, e.g., maintaining, servicing, and retiring. A general shortcoming of the current administration of such activities is a delay in the completion of the activity and the updating of the organization's inventory, and the expense of entering such completion reports of the company's outside installations.

SUMMARY OF THE INVENTION

An exemplary method for administering a construction activity for a telecommunications company can include designing the activity, transmitting the activity to a second datastore, and communicating the one or more tasks. The first datastore may include an inventory of at least one of one or more tasks and inventory items and the second datastore may provide a communication interface for a first entity managing the activity and a second entity completing the one or more tasks to accomplish the activity at a construction site, where the one or more tasks can be communicated to the second entity. Moreover, the second entity can create a change in plan and communicate the change in plan to the second datastore, which in turn communicates the change in plan to the first datastore. Generally, once the change in plan is approved, a task is completed for the activity. The second entity can communicate the completed task directly to the second datastore, which in turn may populate the first datastore inventory with the completed task.

Another exemplary method for administering a construction activity for a telecommunications company can include designing the activity in a first datastore, transmitting the designed activity to a second datastore, communicating one or more tasks, and reconciling all the completed tasks. The first datastore can include an inventory of at least one of one or more tasks and one or more inventory items for the designed activity. Generally, the second datastore provides a communication interface for a first entity managing the designed activity and a second entity completing the one or more tasks to accomplish the designed activity at a construction site. Moreover, the one or more tasks can be communicated to the second entity. Generally, the second entity completes all the tasks for the activity. The second entity can also create a change in plan and communicate the change in plan to the second datastore, which in turn may communicate the change in plan to the first datastore. Once the change in plan is approved by the first entity, a task subject to the change in plan may be completed for the designed activity. The second entity may communicate the completed task directly to the second datastore, which in turn may populate the first datastore inventory with the completed task. Once all the tasks for the activity are completed, the second entity can communicate these tasks to the second datastore, which in turn communicates to the first datastore. Afterwards, all the completed tasks can be reconciled with the one or more tasks created for the designed activity or subject to an approved change in plan stored in the first datastore.

An exemplary system for administering an activity can include a first datastore for storing an inventory of at least one of one or more inventory items each assigned a unique numerical identifier and one or more tasks, a second datastore in communication with the first datastore, and a communication interface. Generally, the activity includes installing at least one inventory item. The communication interface can be between a first entity managing the activity and a second entity completing the installation of at least one inventory item. After completing the installation of an inventory item or creating a change in plan, the second entity can communicate directly with the second datastore to indicate completion or the change in plan. Next, the second datastore may then communicate with the first datastore to record the completed installation of the inventory item or change in plan.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Figure 1:
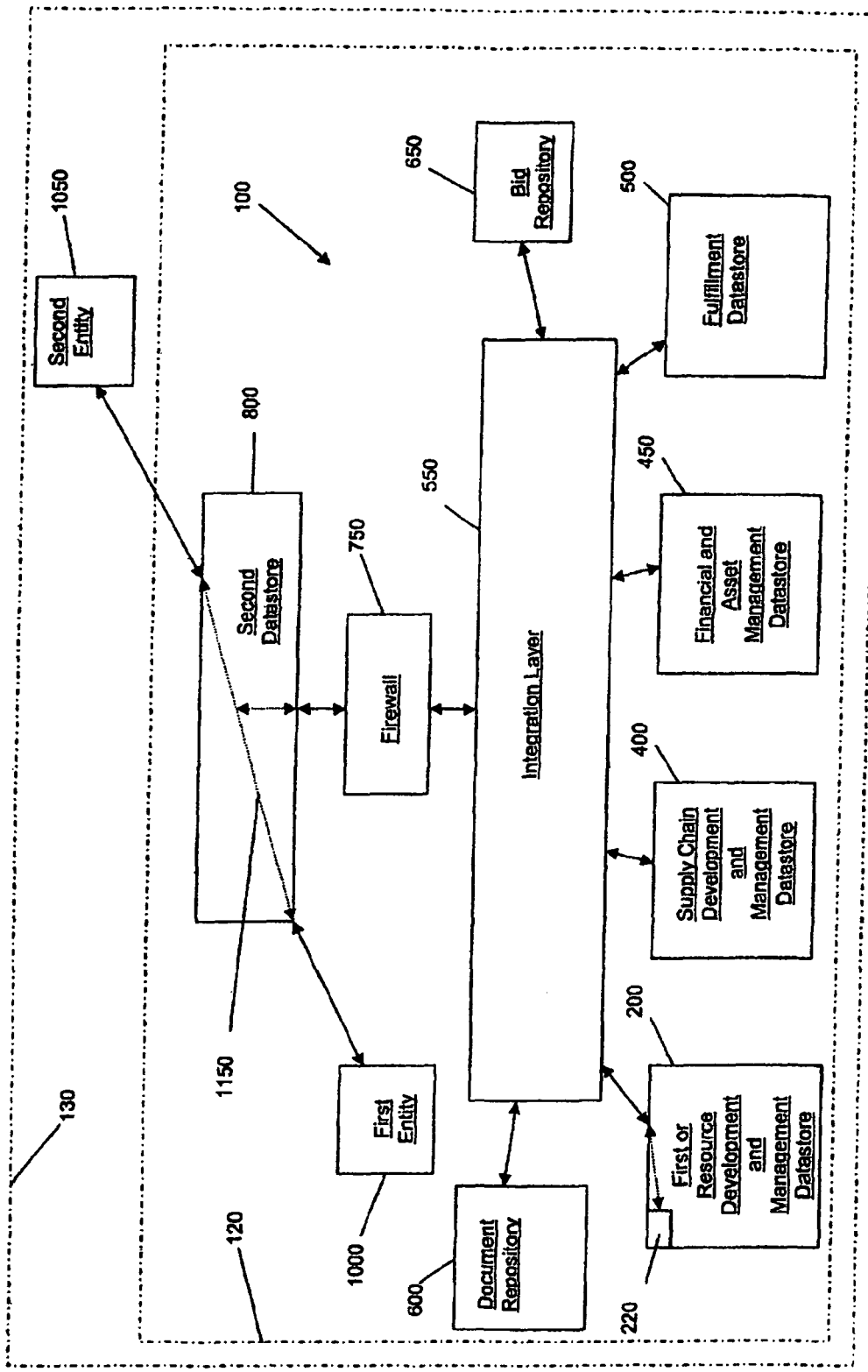
FIG. 1 is a schematic depiction of one exemplary embodiment of a system.
Figure 2:
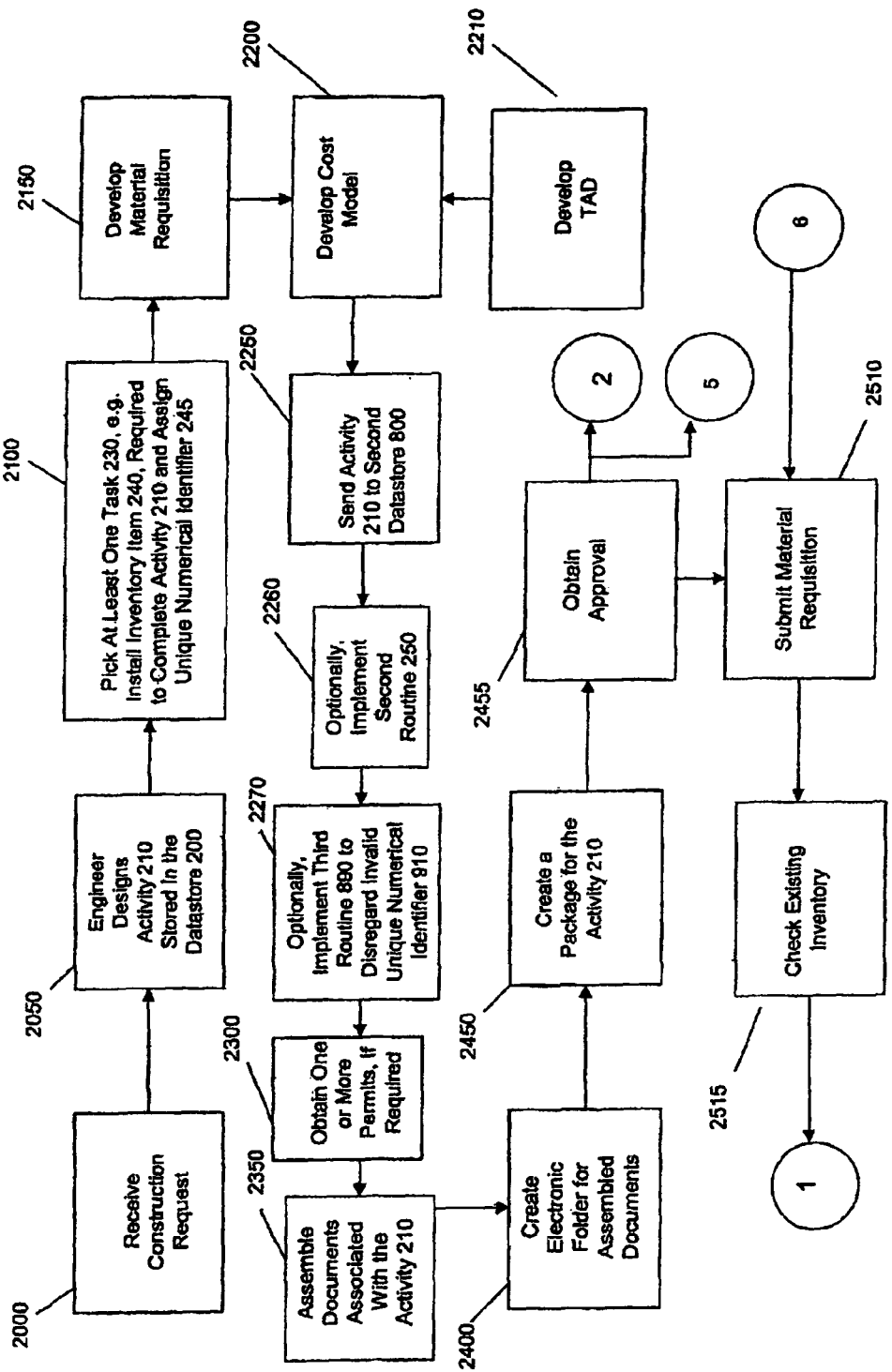
FIGS. 2-5 are block flow diagrams of a mode of operation for administering an activity for one exemplary system.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "organization" refers to a body of persons organized for at least one specific purpose, and includes companies, businesses, clubs, societies, associations, and unions.

The term "first entity" refers to a group that is a part or whole of an organization and administers or manages the completion of an activity, that can include, e.g., designing the activity, purchasing or providing materials for the activity, and storing information regarding the completion of a part or the whole of an activity in an inventory.

The term "second entity" refers to an organization distinct from the organization including the first entity or a group along with the first entity that is part of the same organization. Generally, the second entity is responsible for performing the work required to complete the activity and report the completion of the activity, in whole or part, to the first entity. As an example, the second entity can be a contractor or a work crew of an organization employing the first entity The term "inventory item" is a material outside an office site, such as a plant item or a material inside an office site. A plant item can be a telephone pole, a telephone line, or a communication tower, and may be assigned a unique numerical identifier and its location recorded when installed. An inventory item may also be inside an office site, such as a switch, and may also be assigned a unique numerical identifier.

The term "task" refers to an undertaking required to partially complete or complete an activity. A task may be the installation of an inventory item or an undertaking separate from installing an inventory item to complete an activity, such as ordering materials, obtaining permits, or boring a hole. Thus, a task may or may not be associated with an inventory item.

The term "activity" refers to one or more tasks required to complete a project or job. An activity may be a work activity, i.e. installing a physical item, or a service activity, i.e. servicing a material or entity, and can be initiated by a work or service order.

The term "inventory" refers to an itemized list or catalog of materials. As an example, an inventory can store a listing of inventory items, including their location, e.g. in a warehouse or installed outside of an office of a first entity.

The term "office site" refers to an office of a first entity where one or more operations of the first entity are conducted, which is distinct from "in the field", "field", or "construction site" that is outside the office site and where an activity can be completed. Generally, such an office site would not include an easement granted by a government authority to, e.g., maintain and service power lines.

The term "datastore" or "repository" refers to a store of information, and can include a relational database, a directory service, or a flat file maintained on an electronic storage medium, e.g. hard drive, or another mechanism, e.g., a computer, work station, or terminal, that includes a device to access and manage the information.

The term "change in plan" refers to any change of an original design or a cost model of an activity, which may be approved by a routine or by a person with sufficient level of authority.

The term "business group" refers to a body of persons organized for at least one specific purpose within an organization, i.e. a business group is a subpart of an organization.

The term "business" as used herein is not limited to businesses, but can include, e.g., clubs, societies, associations, and unions.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

One exemplary embodiment of the present system and method may automate the updating of inventory for material installed to complete a construction activity for a telecommunications company. Particularly, the system and method can empower a second entity, such as a contractor and work crew, to mark the completion of a task to update an inventory datastore, e.g., an engineering work order datastore, with an inventory item installed in the field. Particularly, the present system and method may allow the contractor or work crew to notify an engineering construction portal or second datastore once the installation of an inventory item is completed or if a change in plan is desired. Once a completed inventory item is received, the engineering construction portal or second datastore can update the inventory in, e.g., an engineering work order datastore. If a change in plan is desired, the system and method permit the contractor or work crew utilizing the engineering construction portal or second datastore to notify an engineering supervisor and store the change in plan in the engineering construction portal datastore. If the change in plan is approved, an engineer can make the change in design in the engineering work order datastore. Also, the system and method permits the first entity to send an approval to the second entity via the engineering construction portal or second datastore. To facilitate communication, it is generally desired to provide a web-based interactive software application platform for accessing by the first and second entities. Particularly, the contractor or work crew and the engineering supervisor can utilize a graphic user interface (hereinafter may be abbreviated as "GUI") of a web-based application platform to facilitate communication. Additionally, the system and method can permit the first entity to generate an invoice based on the original design or any approved design changes.

Generally, an exemplary system and method provide several advantages. One advantage can be the near real-time or regular updating of an inventory item in a datastore, such as once every 24 hours, e.g. nightly, or more frequently. This updating prevents inventory information from being outdated, and as such, helps preserve data integrity and prevents the undertaking of erroneous work based on this information. Additionally, an exemplary system and method may allow an organization to reject invoices that do not match the activity as ordered. This check can help prevent fraud and provide a mechanism to police contractors and work crews to follow the organization's procedures to, e.g., preserve data integrity. Moreover, an exemplary system and method may allow a change in plan to be communicated back to a first entity, e.g. an engineering supervisor, for approval and entry into the engineering work order datastore. This feature can allow the first entity to generate an invoice based on the original design with any approved design changes. Alternatively, the second entity can generate an invoice from the system of the first entity. Furthermore, an exemplary system and method can empower a contractor or work crew to update the inventory item in an engineering work order datastore. As such, this reduces manual effort by eliminating the necessity of entering such information by other personnel at the office of the organization.

Referring to FIGS. 1-5, an organization 120 or an organization 130 can include an exemplary system 100. Generally, an organization 120 includes a first entity 1000, but not a second entity 1050. In such an instance, the second entity 1050 can be a contractor. Alternatively, the organization 130 can include both the first entity 1000 and the second entity 1050 where the second entity can be a work crew of the organization 130. The organization 120 or the organization 130 can be a telecommunications company 120 or 130. The first entity 1000 can be an engineering supervisor of the organization 120 or 130 who approves the distribution of an activity 210 for completion and any modification of the activity 210, and optionally one or more engineers or data clerks that, respectively, design the activity 210 and enter data associated with it. Generally, the first entity 1000 is at an office site, which in some embodiments includes or is a manufacturing facility.

Generally, the system 100 can include a resource development and management datastore 200, a supply chain development and management datastore 400, a financial and asset management datastore 450, a fulfillment datastore 500, a document repository 600, and a bid repository 650. The resource development and management datastore 200 can further include an engineering work order (hereinafter may abbreviated as "EWO") datastore and a project accounting and cost system (hereinafter may be abbreviated as "PACS") datastore. It should be understood that the system 100 can include any number of datastores, and moreover, each datastore can further include any number of other datastores or be integrated with any number of other datastores.

The first or resource development and management datastore 200 can include a work station where an engineer can design an activity 210, such as identifying the requisite materials, selecting the intended location for installing inventory items 240, identifying services or tasks required for completing the activity 210, developing a cost model, and creating throw away detail (hereinafter may be referred to as "TAD"), i.e., detail, such as drawings, that is stored for a short time period, e.g., the duration of the project. The materials can be one or more inventory items 240 where each inventory item 240 is assigned a unique numerical identifier 245. An activity 210 may require the installation of one inventory item 240, or many inventory items 240, for completing it. The first or resource development and management datastore 200 also permits the storage of one or more inventory items 240 in an inventory 220. The resource development and management datastore 200 stores the location of an inventory item 240 installed in the field. Furthermore, the resource development and management datastore 200 can store other information besides inventory items 240, such as tasks 230, particularly the completion of tasks 230. Additionally, other information, such as tasks 230 and task completions, can be stored in the second datastore or engineering construction portal 800. As an example, a task 230 can be the boring of a hole for installing, e.g., a copper cable.

The system 100 can also include an integration layer 550, a firewall 750, and a second datastore or engineering construction portal (hereinafter may be abbreviated as "ECP") 800. The integration layer 550 facilitates communication among the various datastores and repositories. The firewall 750 provides a protective barrier from unwanted intruders, e.g., hackers, from outside the organization 120 or 130. A second datastore or engineering construction portal 800 can provide a platform for assembling a package for submission to a second entity 1050. Particularly, once an activity 210 is received, a package can be prepared for the activity 210, such as permits and contact information for the contractor or work crew. Also, an electronic folder can be created to store information pertaining to the package, such as a record of the approval of the package by, e.g., an engineering supervisor.

The second datastore or ECP 800 can also provide a communication interface 1150, such as a land line or wireless internet connection, between the second entity 1050, e.g. a contractor or work crew, and the first entity 1000, e.g. an engineering supervisor, as well as the second datastore 800. Thus, the ECP 800 can provide a portal for the second entity 1050 to communicate with the first entity 1000 and other parts of the organization 120 or 130. Particularly, the engineering construction portal 800 can be in communication with the first or resource development and management datastore 200. Generally, all the datastores and repositories can communicate with each other in the system 100, as indicated by the double-arrow lines. In addition, the ECP 800 can include a GUI 1300 that facilitates interactive communication between the first entity 1000 and the second entity 1050. As an example, the GUI 1300 can provide checklists and forms for the first entity 1000 and the second entity 1050 to fill as an activity 210 is being performed. Alternatively, the approval 880 of a CIP 810 can be done by a phone call between the first entity 1000 and the second entity 1050, and documented later in the ECP 800. This information can be conveyed to the first entity 1000 and the first or resource development and management datastore 200, as discussed above. Although a resource development and management datastore 200 and an ECP 800 have been discussed as performing the functions discussed above, it should be understood that another datastore or other datastores could perform the same functionality.

One exemplary mode of operation of a system 100 is depicted in FIG. 25. Although the installation of one or more inventory items is discussed, it should be understood that a different task 230, e.g. service order, could be also administered similarly by the operation described below. Additionally, although the organization 120 is discussed below, it should be understood that this exemplary operation is also applicable to the organization 130.

At a block 2000, a construction request can be received from, e.g., management or another business group within the organization 120. Generally, an engineer designs an activity 210, such as construction, stored in the first or resource development and management datastore 200 at a block 2050. The activity 210 can include one or more tasks 230, such as installing an inventory item 240, or tasks 230 independent of an inventory item 240. That being done, the engineer can assign at least one inventory item 240 required to be installed to complete activity 210 and assign a unique numerical identifier 245 at a block 2100. The engineer can also develop the material requisition at a block 2150 and develop throw away detail at a block 2210. Once completed, the engineer may develop a cost model at a block 2200. Afterwards, the activity 210 can be sent to a second datastore or ECP datastore 800 at a block 2250.

The system 100 can also include a second routine 250 at a block 2260 (first routine described below), which may include instructions in the first or resource development and management datastore 200 to send the inventory item 240 from or delete the inventory item 240 in the second datastore or ECP 800. The system 100 can further include a third routine 890 at a block 2270, which can identify and disregard an invalid unique numerical identifier 910 assigned to an inventory item 240 received from the resource development and management datastore 200 by the ECP 800. Next, one or more permits, if required to undertake the activity 210, can be obtained from, e.g., a local government agency at a block 2300. At a block 2350, documents, e.g. permits, associated with the activity 210 can be assembled. Next, an electronic folder may be assembled for the documents at a block 2400 and a package including the associated documents and the activity 210 can be created at a block 2450. That being done, an approval 880 from a person of sufficient authority, such as an engineering supervisor, within the organization 120, can be obtained at a block 2455.

Figure 5:
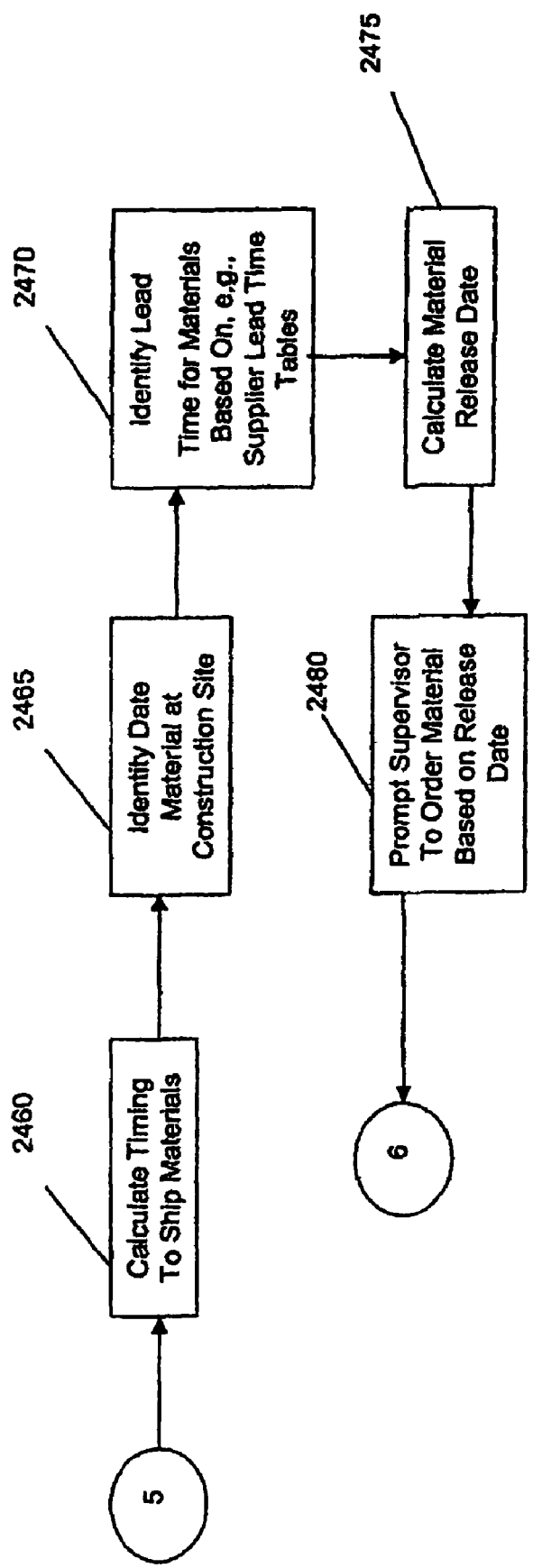

Optionally referring to FIG. 5, the system 100 may also calculate the timing to order materials at a block 2460. Particularly, the date that the material is required at the construction site can be identified at a block 2465 as well as the lead time for materials can be identified based on, e.g., supplier lead time tables, at a block 2470. From that information, the release date of the material can be calculated, by a formula, e.g., material release date equals material due date at site minus ordering lead time, at a block 2475. Next, the engineering supervisor can be reminded to order the material based on the release date at a block 2480. As an example, reminders can be set as days, e.g., 2 days, or hours, e.g., 4 hours, before the release date. An additional reminder can be added after the material release date. Afterwards, generally the operation returns to a block 2510.

Once approval is obtained, the material requisition can be submitted at the block 2510. After checking existing inventory at a block 2515, a question can be asked at a diamond 2520, namely, does the material exist in inventory? If so, the material can be shipped to or access provided to a second entity 1050 at a block 2530. If not, the material may be ordered at a block 2525 and then shipped to or access provided to a second entity 1050 at a block 2530. Afterwards, the material can arrive at a location, such as a construction site 1100, where the material is going to be installed at a block 2535.

Also once approval 880 is obtained at the block 2455, the package, including the activity 210, can be distributed to a second entity 1050, such as a contractor or a work crew, for completing the activity 210 at a block 2550. An optional inquiry can be conducted regarding whether the organization 120 has sufficient internal resources to complete the activity 210 including undertaking the appropriate analysis, or whether the activity 210 should be sent to an outside contractor. Moreover, the system 100 can assign prices for the installation of each inventory item 240 and/or tasks 230 required to complete the activity 210. Afterwards, a question can be asked at a diamond 2600, namely, does the second entity 1050 accept the activity 210 or job? If not, the package can be distributed to another second entity 1050 at the block 2550. Furthermore, for each inventory item 240 requiring installation or task 230 requiring completion, a corresponding location code may be provided. As such, this code can provide an exact location in the field where the inventory item 240 is installed or task 230 occurs, and is inventoried in the first or resource development and management datastore 200.

That being done, the second entity 1050 can receive the materials at the location or deliver the materials to the location at the block 2535. Also, other inquires may be made, such as notification and deposition of defective or incorrect materials, notification of the substitution of other materials, and confirmation of delivery by the second entity 1050. Furthermore, if these materials are borrowed from another activity 210, then a capability of transferring these costs can also be provided.

After the second entity 1050 takes control of the materials at the location of their installation, a question may be asked at a diamond 2650, namely, did the second entity 1050 complete one or more tasks 230? At this point, the second entity 1050 may submit a change in plan 810 (hereinafter may be referred to as a "CIP") to the second datastore 800 via the communication interface 1150 at a block 2700. The change in plan 810 can be installing a different material or a different size of material, installing a material at a different location, adding or modifying a task, or other actions or items similarly different than that specified in the package received by the second entity 1050. The entering of the CIP 810 can entail utilizing a web-based software platform 1250 with a GUI 1300 with features such as drop-down menus and standardized forms. This communication may be made by a laptop computer in the field via a wireless connection or an office computer at the second entity's office. Thus, the second entity 1050 can communicate contemporaneously, i.e., real-time, in the field or at the end of the day from their office.

The system 100 can further include a first tolerance range 820 and a second tolerance range 824. The first tolerance range 820 can allow certain changes by the contractor without approval by the first entity 1000, e.g., the engineering supervisor, at a diamond 2704. As such, generally the changes are entered into the first or resource development and management datastore 200 and the approval automatically communicated back to the contractor. If outside the first tolerance range 820, a second query may be made at a diamond 2708, namely does the CIP 810 fall within a second tolerance range 824? If yes, the second tolerance range 824 can permit approval of certain changes by the engineering supervisor at a diamond 2720. If outside the second tolerance range 824, the change can be made if a first routine 830 defines a sufficient level of authority (hereinafter may be referred to as "LOA") 840 approving the CIP 810, i.e. a manager of sufficient rank approves the CIP 810, at a diamond 2712. There may be alternate bases for tolerance ranges, such as types of tasks 230 or monetary costs, which can also require a sufficient level of authority to permit the change. In one exemplary embodiment, the sufficient LOA 840 can be an engineering supervisor. If approved, generally the query proceeds to the block 2730, or otherwise, the diamond 2650. While in practice, some modifications are automatically approved and do not require a formal CIP approval, for the purposes of this disclosure these changes (such as changes within the first tolerance range of this embodiment) are also considered CIPs.

At the diamond 2720, another query can be made, namely is the CIP 810 approved by, e.g., the engineering supervisor? The engineering supervisor can review this information in an online or offline format. In one exemplary embodiment, the GUI 1300 of the second datastore or ECP 800 provides an approval button or checkbox for accepting the CIP 810. If not, then the next query may return to the diamond 2650. If approved, then the CIP 810 can be transmitted to the resource development and management datastore 200 at a block 2730. Afterwards, generally the inventory 220 of the first or resource development and management datastore 200 is updated with the CIP 810 with respect to the changed inventory item 240 at a block 2740. That being done, the resource development and management datastore 200 can communicate with the ECP 800 and overwrite the original activity 210 with the CIP 810 in the ECP 800, and subsequently may send the approval 880 of the CIP 810 to the second entity 1050 at a block 2750, and return to the query at the diamond 2650.

If one or more tasks 230, such as installing inventory items 240, are completed at a block 2800, then the second entity 1050 may communicate the completion of the installation of the inventory item 240 to the ECP 800 at a block 2850. As an example, the second entity 1050 can check an inventory item 240 depicted on a screen of a software application in the ECP 800 accessed via the communication interface 1150, e.g., an internet link. Moreover, the second entity 1050 may submit an as-built or completion report utilizing the GUI 1300 to describe how and where the inventory item 240 was installed. Next, the ECP 800 may communicate with the first or resource development and management datastore 200 to update the inventory 220, by, e.g., characterizing this inventory item 240 from pre-post to final post at a block 2900. The system 100 can also include a fourth routine 260 to categorize the inventory item 240 at a block 2910. Such categories 276 can include defining the inventory item 240 as a removal or retiree 270. If the inventory item 240 is identified as a removal or retiree 270, the first entity 1000, e.g., engineer, can receive a prompt 280 before populating the inventory 220 with the removal or retiree 270.

Next, the organization 120 can generate an invoice 850 at a block 3050. Generally, the organization 120 can generate the invoice 850 at a predetermined interval, such as weekly, after predetermined number of inventory items 240 or tasks 230 are completed, after specified inventory items 240 or tasks 230 are completed, or other similar approaches. The invoice 850 generally is based on the completed tasks 230 or inventory items 240 completed during that interval. The organization 120 may generate the invoice 850 from data stored in the first or resource development and management datastore 200. Afterwards a query may be made at a diamond 3250, namely is the second entity 1050 part of the organization? If so, the invoice 850 can be submitted to payroll at a block 3300. Otherwise, the invoice 850 can be submitted to accounts payable at a block 3350. Regardless of whether the invoice 850 is submitted to payroll or accounts payable, next generally the account is reconciled and a payment 860 is issued at a block 3500.

In this manner, a payment can be sent to a second entity 1050, such as contractor, based on the original design with any changes in plan 810. If the contractor has installed an inventory item 240 and not followed the procedures of the first entity 1000 by seeking approval of a change in plan 810, the burden is on the second entity 1050 to explain why they did not seek approval for their deviation from the assigned task 230. This permits the first entity 1000 to impose penalties for the failure to follow proper procedures. What is more, this process eliminates the requirement of manually matching an invoice 850 originating from a second entity 1050 with the project design to make sure the contractor installed what was design or sought approval of any changes.

Figure 3:
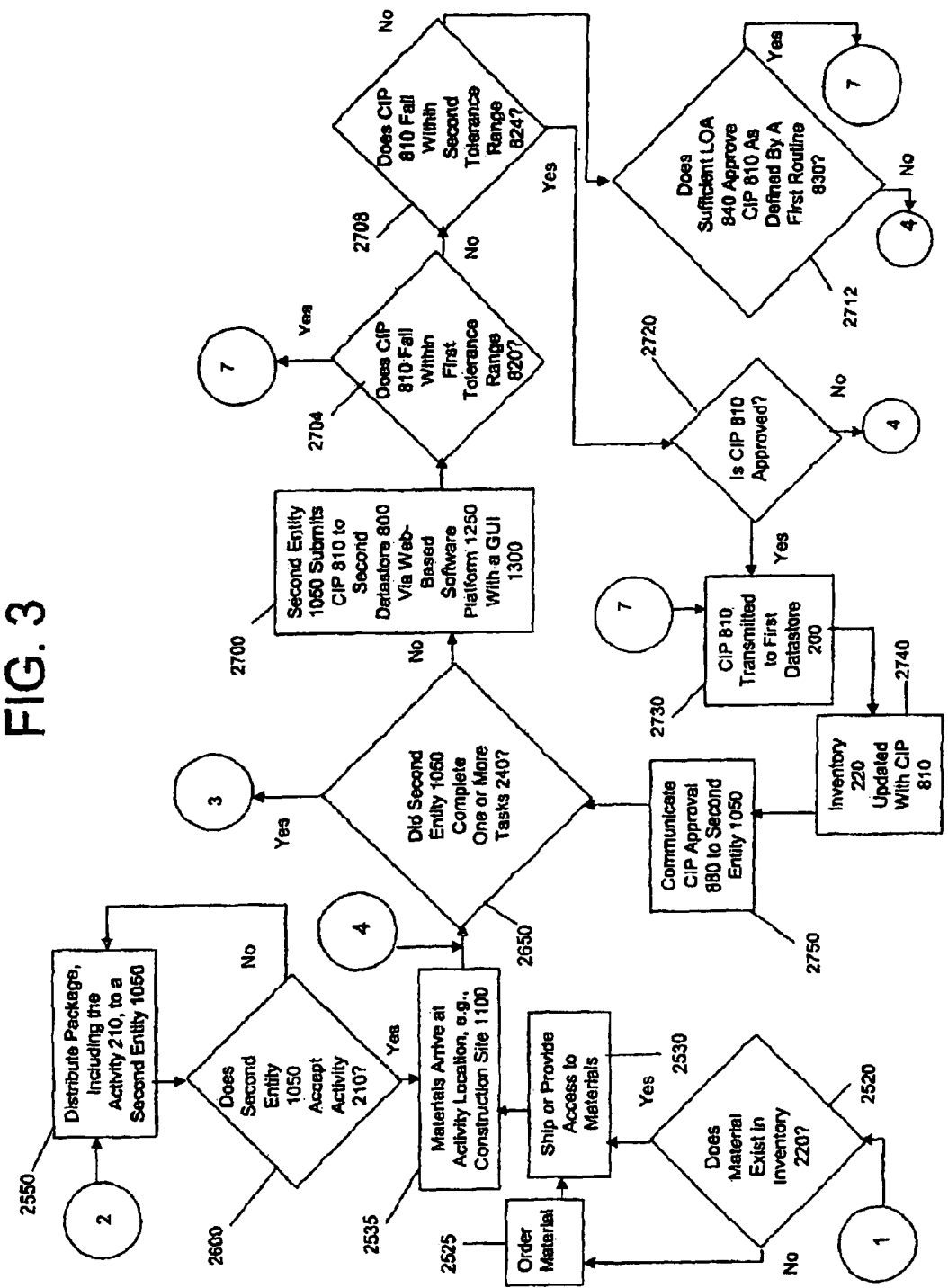
Figure 4:
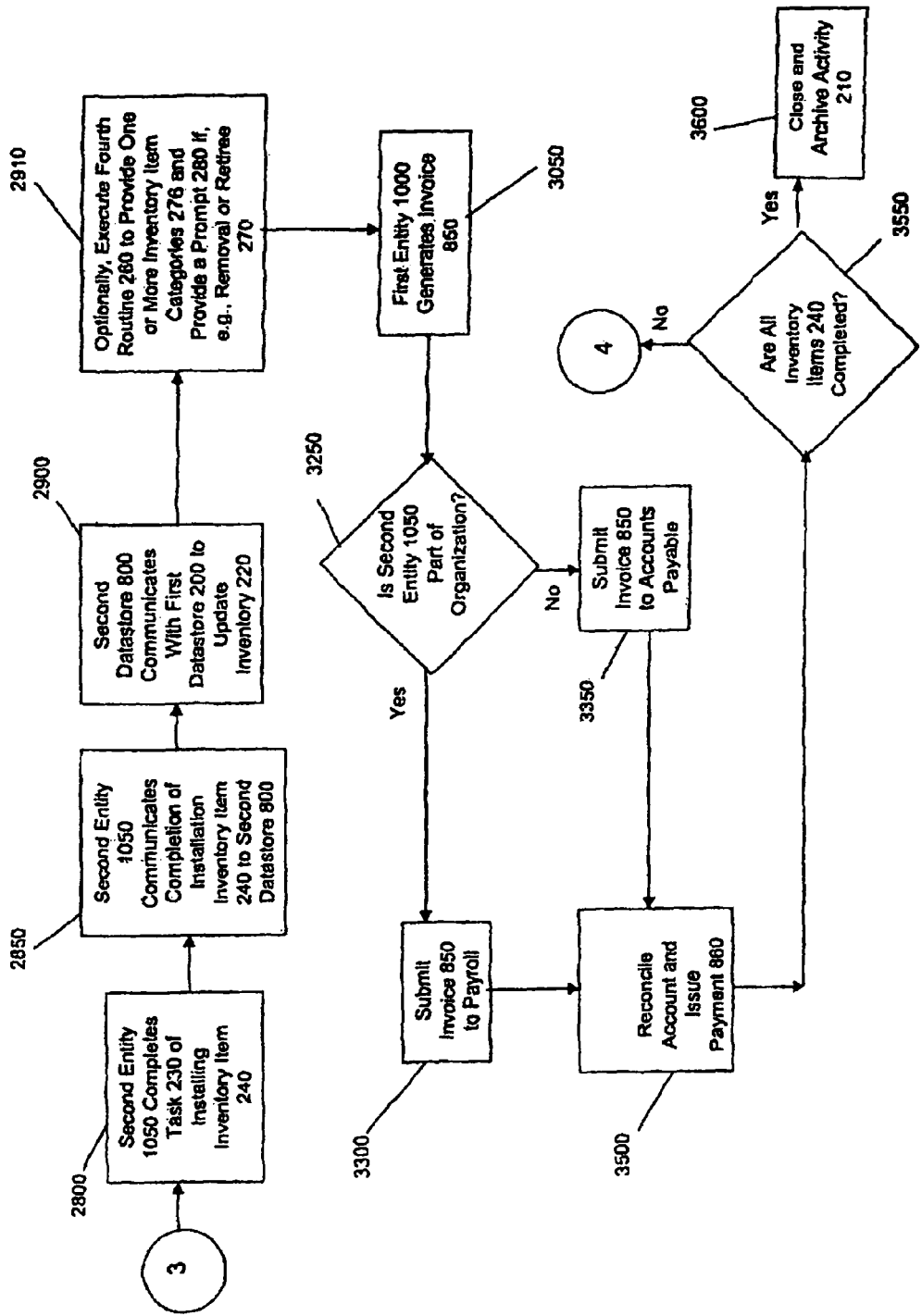

Afterwards, a query can be made at a diamond 3550, namely, are all inventory items 240 completed? If not, a query may be made again at the diamond 2650 in FIG. 3. If so, the activity 210 may be closed and archived at a block 3600. This procedure can include having personnel of sufficient authority, such as engineer, approve the final closing of the activity 210. The final closing can include completing all system checks, including verifying the completion of all tasks 230, such as the installation of inventory items 240. Moreover, the engineer can remove or document from the first or resource development and management datastore 200 all inventory items 240 that are removed or retired. In addition, the engineer can close the activity 210 and electronically archive some or all of the records/data for a period of time, such as seven years.

In an alternate embodiment, the second entity 1050 may submit an invoice 850 to the organization 120 after the block 2910. The invoice 850 may be inputted into, e.g., the financial and asset datastore 450, to begin reconciliation. Next, data from the invoice 850 can be communicated to the first or a resource development and management datastore 200. Afterwards, a query may be made, namely does the task 230 or inventory item 240 data from the invoice 850 match the task 230 or inventory item 240 data for the activity 210 in the resource development and management datastore 200. If not, the invoice 850 may be rejected and the organization 120 can notify the second entity 1050. If matched, this procedure can proceed as described above, beginning at the diamond 3250. Thus, this embodiment also has a procedure for rejecting invoices 850 that deviate from the original plan absent approval.

In one aspect, the present system gathers accounting information, such as labor codes, cost center, location codes, work activity, etc. The present system automatically associates all accounting information and master contract information, such as cost center, location codes, work activity numbers, master contract numbers, supplier information, effective/expiration date, functional/natural accounts, etc., to be completed and validated work activity tasks for invoicing for a unit master contractor, an hourly master contractor, or a competitive bid job.

In one aspect, the system enables external work activities, such as outside contractors, and the like, to be entered manually into the system. Further, preferably all internal work activities are entered automatically by the system. In addition to the above, the present system is capable of generating invoices for outside contractors. These invoices are created for functions outside the engineering and construction work activity process, like for service orders, such as buried service wire, DSL, payphones, etc. The system supports alternative workflow for non-work activity contract invoice processing. In addition, the present system provides for outside contractors to manually initiate an invoice for contract labor for non-work activity tasks outside of engineering and construction, such as contract work, CO contract work, data migration, etc. The present system further provides for outside contractors to input master contract number for non-work activity task invoicing and to supply contractors with a list of valid task line-items (via dropdown) based on master contract agreement number for non-work activity contract invoicing. It also provides for contractors to add task line-items from dropdown list (e.g. task-type, task qty) for contract labor for non-work activity tasks.

The present system also validates task line item fields and values at time of user entry for work activity contract invoicing. Some exemplary list edits are master contract number is valid, location code is valid, master contract is active, etc. The present system displays an exception message to the user if invalid task line item fields are entered, and prompts users to correct errors before proceeding for work activity contract invoicing. The present system also assigns price/rate to each task line item entered by contractor for work activity tasks based on a master contract agreement number. Also, it provides for contractors to confirm invoice prices/rates and submit work activity invoices for contract labor via workflow. The present system provides for contractors to change or delete task line items on a work activity invoices for contract labor when reviewing invoices and to input work activity approver's list associated to each master contract agreement.

The present system also routes work activity invoices for contract labor to associated approvers based on master contract number. It also provides for the approvers to reject work activity invoices for contract labor via workflow with comments. Ability for system to route rejected non-WA invoice for contract labor to invoice originator via workflow. The present system provides for an invoice originator to review rejection comments and correct work activity invoices for contract labor and for contractors to re-submit work activity invoices for contract labor, both via workflow. Also, approvers may approve work activity invoices for contract labor via workflow. The present system automatically places the date/time and approver's name on the invoice for work activity contract labor. Further, the present system sends work activity contract invoices to accounting for payment, this includes associating the correct general ledger accounts, natural accounts, functional accounts, etc. The present system also provides for contractors to delete un-approved invoices for work activity contract labor from the system.

The present system provides means for enabling contractors to delete an un-approved invoices. It also provides for data support to initiate new invoices for manual adjustments to previously paid invoices that require correction. In one aspect, the data support is enabled to make manual adjustments to invoices that may have already been paid incorrectly, including manually creating an invoice number. The present system receives completed tasks for contract labor that have passed validation and automatically processes invoices for payment.

The present system validates invoice values, such as location code, effective date, labor code, active work activity number, standard rate tables, etc. It also validates edits, including location code, effective date, labor codes, active work activity numbers, standard rate tables, etc. The present system prompts clerks to resolve invoice validation fallout via workflow and to resolve edit fallout. It provides for clerks to resolve invoice validation fallout and re-submit invoice for validation via workflow. It also automatically generates a unique invoice number for tracking and gathers accounting information, such as labor codes, cost center, location codes, work activity, etc. The system reports all items submitted for invoice by a predetermined period, such as by month.

The present system also creates reports as needed. It also supports vendor numbers, vendor locations (payment controls), and vendor address sequence numbers (individual address for supplier, where check gets sent). The present system accommodates vendor numbers, vendor locations (payment controls), and vendor addresses, and sequence numbers. The present system aggregates validated tasks into a single daily invoice per contractor for payment, aggregates validated tasks into a single daily invoice for unit master contractor for payment, and aggregates validated tasks into a single daily invoice for hourly master contractor for payment. The present system determines the percent of effort completed for cost quote/competitive bid jobs based on effort completed vs. effort planned. It also aggregates validated tasks for cost quote/competitive bid jobs for payment by the percent complete, such as 30% complete, pay 30% of job out to contractor, at 60% complete, pay 60%, etc. at step 4806. The present system files a copy of the invoices with date in document repository associated to work activity when invoices are sent to accounting for payment.

At step 4808, the present system notifies a construction supervisor and master contractor that a new invoice has been sent to accounting for payment and posted to the document repository for a work activity via workflow, including a link to the invoice. The present system further provides receives contractor invoices for payment processing and read ECP 800 invoices. The system sends paid invoice confirmation by work activity to the workflow system. In addition, the present system posts contract invoice actuals to work activity and posts invoice actual charges for work activity in ECP 800. The present system randomly selects work for inspection at a task, segment and work activity level. The present system randomly selects work for inspection with weighting factors related to historical data for master contractor performance by task. It also adjusts the percentage of work that is selected for random inspection by district. The present system provides for construction supervisors to manually select work to be inspected at a task, segment, or work activity level. In addition, the system prompts construction supervisors to perform inspection of specified work. Further, it prompts construction supervisors to perform inspections of specified work via workflow and displays inspection checklists/forms to construction supervisors via workflow.

The system enables construction supervisors to download inspection forms from portal into offline forms, enables construction supervisors to input inspection results in offline forms, enables construction supervisors to input inspection results in online portals, and enables construction supervisors to upload changes recorded in offline forms back into online portals for inspection. It also enables construction supervisors to indicate work as satisfactory vs. defective for each task on a particular inspection form via workflow. The system requires construction supervisors to enter defect related information, such as comments, penalty credit, etc., for each task marked as defective on an inspection form via workflow. The present system enables construction supervisors to complete work activity inspection reports information on the inspection form via workflow and enables construction supervisors to complete quality performance summary information on the inspection form via workflow. The present system automatically creates quality performance scorecards for master contractor, network engineer, and in-house crew members. It also automatically captures inspection results by task type, and performing agent, such as master contractor, engineer, in-house crew members, for historical tracking purposes. In one aspect, the it uses this data to generate weighted inspection triggers for random inspections. The present system also enables administrators to define default recipient lists for inspection forms by district and to automatically distribute these documents to necessary parties. Further, it enables construction supervisors to add/change/delete recipients to the default distribution lists for inspection forms and enables construction supervisors to indicate that inspections are complete and then distribute them via workflow.

The present system automatically distributes completed inspection forms to necessary recipients, including performing agents, master contractor/network engineer/in-house crews. It further automatically distributes completed inspection forms to document repositories associated with work activity. Also, the system assigns start dates and completion dates for correction of defective tasks. In addition, it automatically prompts master contractors or in-house crews (original performing agent of defective task) to correct the defective work via workflow. It also creates and sends credit invoices to accounting for inspection penalties associated with defects and automatically triggers a re-inspection of tasks once defects have been resolved. The system further sends existing inspection forms for previous defects to construction supervisors for re-inspection. The present system automatically reconciles all account charges at individual line item levels, including material and labor. It further reconciles accounts.

Figure 7:
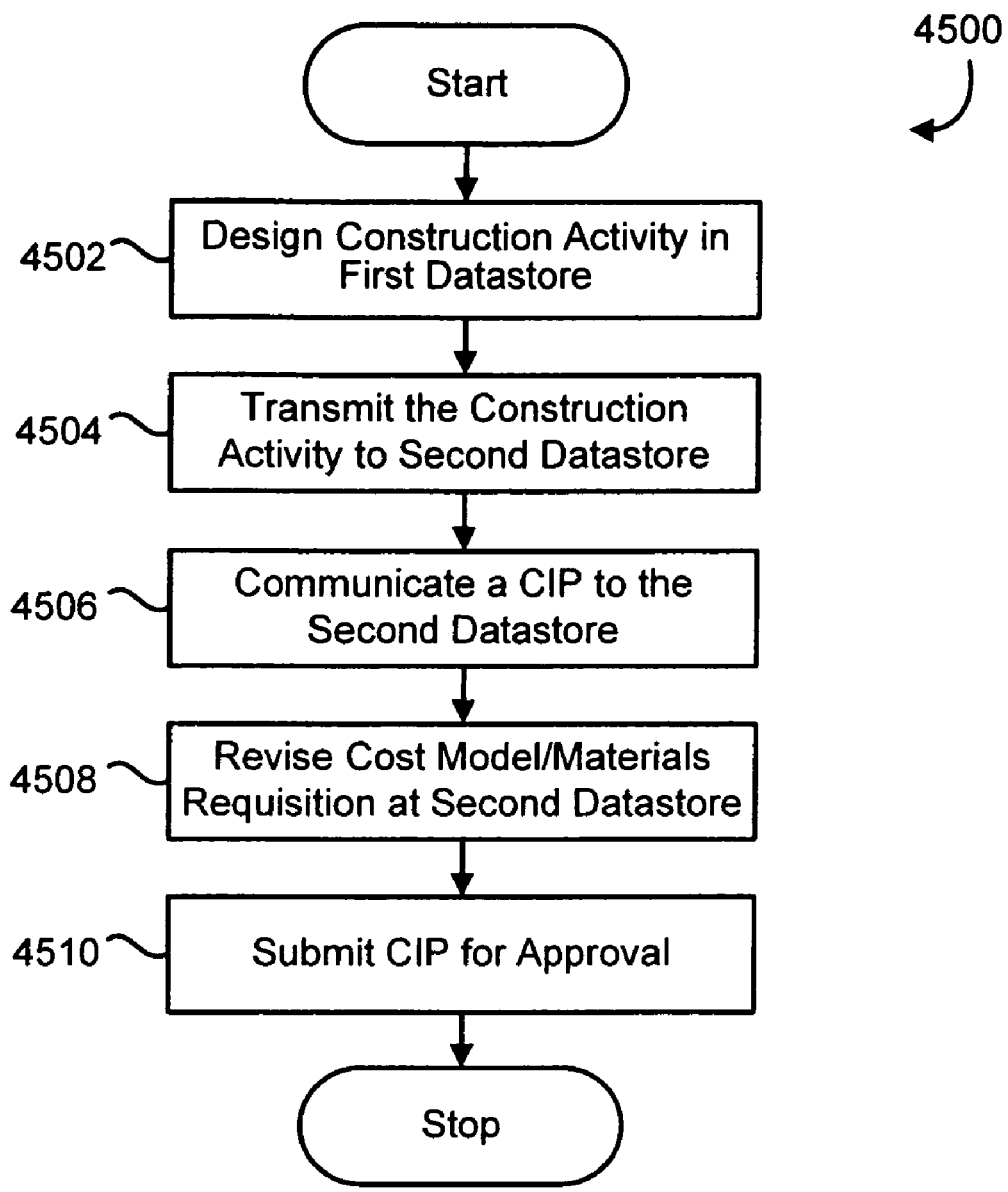
FIG. 7 illustrates a block diagram of an exemplary process for changing a plan of a construction activity according to an embodiment of the present invention.
Figure 8:
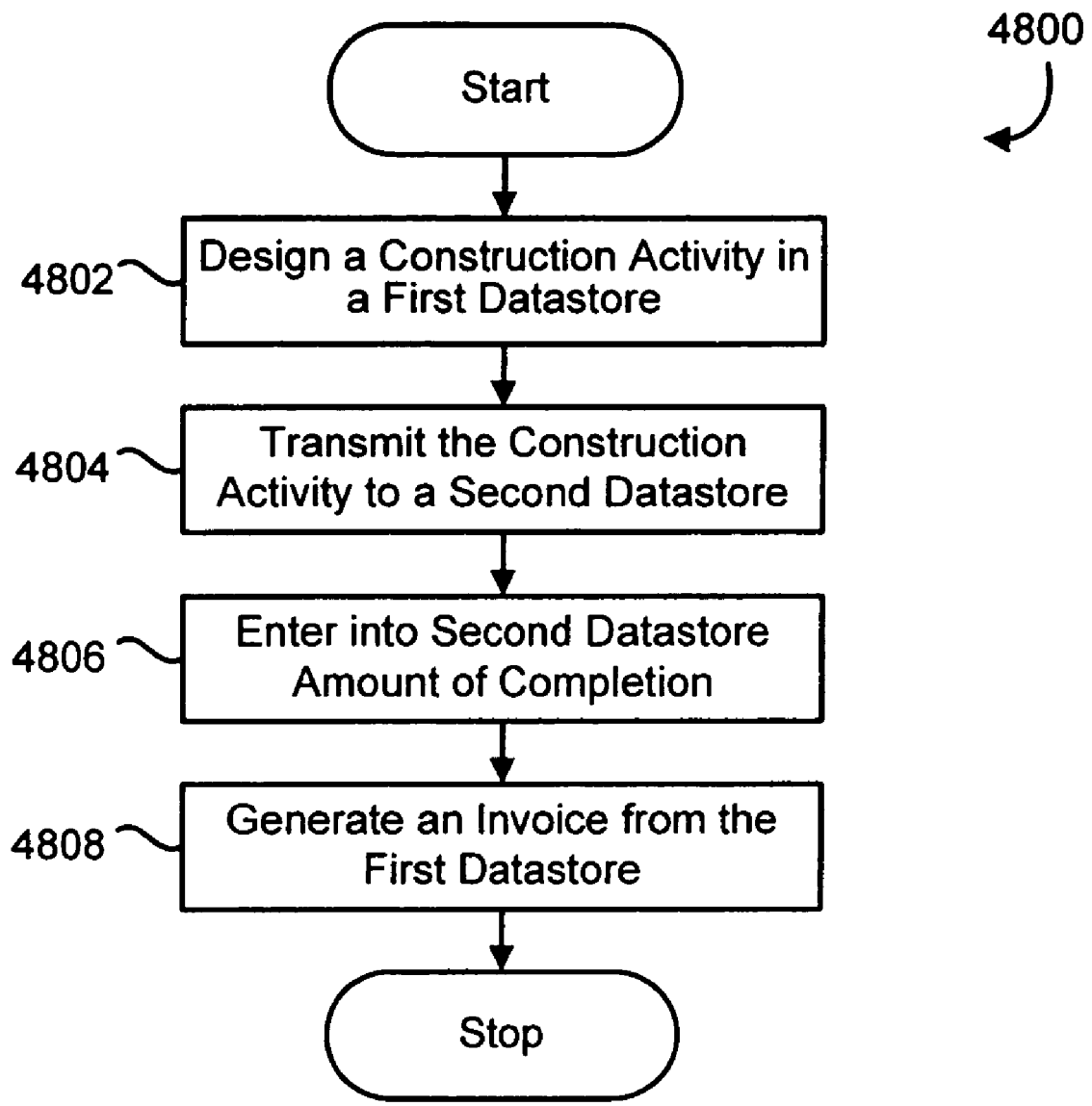
FIG. 8 illustrates a block diagram of an exemplary process for billing a construction activity according to an embodiment of the present invention.

A method and system can be further illustrated by the following example of an activity 210 of installing a length, such as 1000 feet, of cable. An engineer can receive a request for installing 1000 feet of cable for erecting data transmission lines. The engineer can request the cable from inventory, assign a unique numerical identifier 245, and enter its specifications and throw away detail, e.g., drawings, into the first or resource development and management datastore 200 at steps 4502 and 4802 (FIGS. 7-8). Afterwards, this activity 210 may be sent to the second datastore or ECP 800, where a package can be assembled, including any drawings and permits. After this package is approved by an engineering supervisor, it can be sent to a contractor for installation.

The contractor can inspect the site for installation of the cable. If the contractor decides that 1000 feet of cable is insufficient for installation, the contractor can submit a CIP 810 for 2000 feet of cable by entering the change through the application software of the second datastore or ECP 800. This CIP 810 can be submitted by inputting the change into a laptop computer in the field, which may be in communication with the second datastore or ECP 800 via a wireless link. A revised cost model and materials requisition can be generated at this time at the second data store or ECP 800. The CIP 810 can be reviewed by the engineering supervisor, who can approve it using the GUI 1300 of the second datastore or ECP 800. Also the system 100 can have a first tolerance range 820 that can permit certain changes without approval and a second tolerance range 824 that can be overridden with a sufficient level authority 840. In this example, a CIP 810 of 1010 feet of cable can be approved automatically by being within the first tolerance range 820, but a CIP 810 of 2000 feet of cable is approved by an engineering supervisor.

When the CIP 810 is within the first tolerance range 820 a notification is sent to an engineer to perform the updates or changes of the CIP 820. A cost model and material requisition may be approved by the engineer.

When the CIP 810 is outside the first tolerance range 820 an engineer or supervising engineer may approve the CIP 810 request. The approved CIP 820 including any notes deemed important are sent to the one of the other of the engineer or supervising engineer who didn't approve the CIP 810. The CIP 810 is posted to the second datastore or ECP 800. A notification is sent to the engineer for any necessary manual updates to the records of the ECP 800. The cost model and material requisition are updated and approved as necessary by the engineer or supervising engineer and sent to the second datastore or ECP 800 at block 2250.

When the CIP 810 is outside the first tolerance range 820 and the approval by the engineer or supervising engineer is rejected the CIP 820 may be posted to the second datastore or ECP 800. A notification is sent from the second datastore or ECP 800 to a construction supervisor that payment for the change specified in the CIP 820 was not approved.

Once the engineering supervisor approves the 2000 feet of cable, the CIP 810 may be transmitted to the first or resource development and management datastore 200 and the inventory item 240 in the inventory 220 can be manually updated with the CIP 810. Afterwards, generally the resource development and management datastore 200 overwrites the second datastore or ECP 800 with the 2000 feet of cable CIP 810, and then sends a message to the contractor that the CIP 810 is approved, e.g. by the engineering supervisor, and that the contractor is to proceed. A copy of the approved CIP 810 can be sent to the contractor, a construction supervisor, and a facility coordinator, if applicable. The contractor can install the 2000 feet of cable and then notify the ECP 800 that the inventory item 240 for installing the cable is completed, by again, utilizing the GUI 1300 of the ECP 800 and providing a completion report, if required. The contractor can provide notification in the field by utilizing a laptop communicating via a wireless connection or provide notification after returning the contractor's office by utilizing a desktop computer communicating via a landline. Generally, the completed inventory item 240 for the 2000 feet of cable is communicated from the ECP 800 to the resource development and management datastore 200, where the inventory item 240 can be changed from pre-post to final post.

Referring to FIGS. 7-8, a method and system can be further illustrated by another example of an activity 210. When the change is only to the material requisition (block 2150) or cost model (block 2200) the construction supervisor or engineer is notified of the change at steps 4504 and 4804. The change in the material requisition or cost model is entered into the CIP 810 to reflect the changes made on the revision at step 4506. The CIP 810 may then either be approved or rejected. If it is rejected, then originator of the CIP 810 request is notified for resolution. If it approved, then a copy of the CIP 810 is sent to the contractor. A new version of the cost model and material requisition is then prepared at the second datastore or ECP 800 if applicable at step 4508. The process then proceeds back to block 2455 for approval if applicable at step 4510. Revised construction prints and associated documents are then distributed to individuals that received the original package. Then the approved package is sent to the construction supervisor.

In one exemplary embodiment, the GUI 1300 of the second datastore or ECP 800 provides or displays to a user with options to edit an entire task list, such as displaying to the user an add manual comments section, a change task type option, a change material type option, an add/remove task option, an add/remove material quantities option, and add/remove new task or material, when a change in level of the package is desired by a user. In another exemplary embodiment, the GUI 1300 of the second datastore or ECP 800 provides or displays to a user with options to initiate an existing task level change request. The GUI 1300 prompts the user to select an existing task to be edited. Then, the GUI 1300 provide the user with options to edit the selected task, such as change task type, change material type, add/remove task, and add/remove material quantities. Further, in yet another embodiment, the GUI 1300 of the second datastore or ECP 800 provide or displays to a user with options to initiate a new task level change request. The user is prompted to enter new task or material requests. An engineer may complete any portions of this display that is missing from the user's inputs.

Once the level change requests have been completed, the second datastore or ECP 800 determines whether the material requisition is impacted. If the material requisition is impacted, then the user is prompted to determine whether the disposition of materials is new, a transfer, or a return if applicable. If the material disposition is a new, then a material requisition is generated reflecting the material usage. The material information, such as material codes, quantities, etc., is populated into the change control. This may be done automatically based on information that was approved previously. Then the GUI 1300 prompts the user to select ship to information. Additional notes may be entered into the GUI 1300 regarding these changes. Then the required at site date is assigned for the material and the material requisition is submitted to the ECP 800. This is then followed by the material ordering process being initiated in the ECP 800.

If the material disposition is a transfer, then the supervisor, network engineer, and/or approver is prompted to indicate if material replenishment is needed and to validate or enter the "borrowed from" fields of the GUI 1300. If the data was entered previously, the supervisor, network engineer, and/or approver can then edit the information in the GUI 1300. If the data was not entered previously, then the supervisor, network engineer, and/or approver may then enter the data into the GUI 1300.

If the material was borrowed from employee stock, then the name of the employee who owned the stock is inputted into the GUI 1300 and the supervisor and/or network engineer is prompted to enter the material use reports (MUR) into entity 450. If material replenishment is needed, then the employee is stocked and charged against the employee stock. If the material transfer is triggered from non-design work activity actuals, then material cost is applied against the non-design work activity.

If the material is borrowed from another work activity, then the borrowed material is inputted into the work activity. To do so, if the work activity is triggered from a non-design work activity, then the charges from the borrowed work activity are automatically transferred to the other work activity. If the work activity is triggered from change control, then charges are automatically deducted from the borrowed work activity and not transferred to the other work activity. This typically will be handled as part of the normal change control process for updating the cost model. If replenishment is needed, then the non-design material requisition is submitted, as described above, to replenish other work activities and then charged against the borrowed work activity.

If the material requisition is not impacted, then it is determined whether an LD assignment is required. If the LD assignment is required, then the user is prompted to enter a new or revised LD assignment. This information may be optional for change control type new tasks or materials, but is preferably required for change control type change LD assignments.

In another exemplary embodiment, the GUI 1300 of the second data or ECP 800 provides or displays to a user the option of changing the control request. A new sequential number is generated for each change request by the second datastore or ECP 800. The type of change control is determined, such as whether it is a change in resource type, an update to overhead or IDC estimates, an existing task level change, a new task level change, or a work activity level change. Then, the level of authority or position that is required to approve the change is determined. In one embodiment, the construction supervisor and originating engineer are approvers for all change request types. Then other related work activities or packages are checked to see if they are impacted by the requested change. If another work activity or package impacts tasks that were changed as a result of the change control, then the work activity is flagged and a notification is sent to the approver informing them that change control has a potential impact on both work activities. At this point, the approver may manually check to confirm the impact and resolve the impact, such as initiating another change control.

After the impacts on other work activities has been checked, the approver is sent the change control. In one aspect, if the requestor is the approver, then the change control is automatically approved. If the requestor is not the approver, then the change control is sent to an approver for approval. If the change control is rejected, then the approver places rejection notes on the change control. A notification is sent to the individual that entered the actual change control indicating the rejection. Further, a notification may be sent to a construction supervisor that payment for the specific task was not approved and requesting that the construction supervisor take appropriate action. The approver is prompted to validate or enter any missing task/material information that may not have been entered or known by the requestor at the time of the time of the creation of the change control as described above. Then, it is determined whether the material requisition or return is impacted as described above. Then, it is determined whether a LD assignment is required as described above.

Once the LD determination is made, a determination regarding if records are impacted. If records are impacted, then it is determined whether the records can be updated either manually or automatically. Some exemplary records that may be automatically updated include the change in cable footage, lead/structure number, material codes, field codes, pole height, and class tasks. If the records can be updated automatically, then ECP 800 sends those updates to EWO and EWO makes the changes of the materials on the record. Once the records are systematically updated, then EWO sends the materials back ECP 800.

If the records must be update manually, then a notification is sent to the EWO administrator to add cable types to EWO if the requested material type is not already in the EWO. Then a notification is sent to the originating engineer via the ECP 800 to perform change control record updates. Matching data is transmitted to the ECP 800 with the expected data, which is compared to the cost model/change control data and a message is sent to the engineer or engineering manager if the two are not identical. ECP 800 will recognize when an IPID change has been made without an open change control in the ECP 800. If this happens, then the engineer is prompted to review the "unauthorized change" in the EWO. Next, the change control notification to update inventory records from workflow is received. The EWO session is initiated, which recreates the work activity on the user's workstation, logs them into the appropriate exchange, and takes them to the work activity for the change control. An initial complement check is performed for existing maps prior to engineering design. If any errors exist in the initial compliment check, then the engineer resolves the initial complement check errors.

The cable counts are investigated to determine if special circuits are affected, and the work activity is designed to ensure that existing service is maintained. The existing facilities are then updated based on the change control request. The method of construction, such as aerial, buried, underground, etc., and whether any foreign facilities will be utilized that will require owner's permission are determined. If foreign utility poles are used, the consent of their owners is sought and the proposal or permit is then completed for attachments to foreign utility poles. Based on the change request, the OSP features/LDs in design are modified, placed, or removed, and the TAD is updated and the work prints are refreshed. This may include associating new LDs into the existing footprints. Then the new facilities are updated to approved pre-post.

The final complement check is performed for new changes to maps, after design work. If there are errors on the final complement check, then the engineer resolves final complement errors. The work activity is then posted to save DGN to EWO master file. The LDs, IPIDs, and footprints are generated and sent to the ECP 800.

The TAD may then be updated if applicable. It is determined whether the cost model is impacted as described above. If the cost model is impacted, then existing tasks are updated with revised information, such as task type, quantity, material type, LD, etc., based on the change control. The new tasks are populated with all associated information based on the approved change control. The task is then defaulted to the task type assignment, such as place, splice, and remove. The notes by tasks for additional construction information is then inputted, and the task accounting is associated with all tasks. In addition, the task is associated with a labor pricing and with a master contract agreement. If the resource is hourly, then the hours are populated based on the approved change request. Further, the material pricing information is associated with the material codes, and the retirement cost information from the EWO is associated with the cost model. The estimated overhead is then associated based on the existing business rules. Based upon interest rate tables and the estimated cost model amount, the interest during construction is estimated. Then the sales tax for material invoices is calculated, and all costs are totaled.

the cost model distribution is generated by month where all material costs are allocated to the month indicated in the RAS date. Typically, the labor costs will be evenly spread across the months for each task type, and the work activity is indicated whether it includes central office equipment.

Then, a determination is made whether the fiscal policy check is required. If it is required, then the original approved cost model amount is validated against the updated cost model. If the difference is less than a predetermined percentage, then the fiscal policy is not violated. Then the change to the work activity is stored for further use as an audit trail of changes to the work activity that occurred between fiscal approval events. If the difference between the original approved cost model and updated cost model is greater than a predetermined percentage, then the fiscal policy is violated. If the fiscal policy is violated, then all changes to the work activity between the last work activity fiscal approval are retrieved for display to the approvers.

The sequence of approvers is determined based on the dollar amount that may be defaulted by district of the work activity. If the originator of the work activity is valid for an approved dollar amount, then the CIP 810 automatically approves the work activity and moves to a validation step. The list of approvers are displayed and the work activity is routed through the listed approvers accordingly. System edits are performed to ensure that all required fields are populated and correct. If the edit function fails, then the view approval error is displayed to make corrections and return to initiate process. It is then determined whether the child work activity exceeds the parent approved dollar amount. If the parent dollar amount is exceeded, then the network engineer is prompted to correct work activity or request supplement to the cost model. If the engineer corrects the work activity, then the system is returned to capability. If the engineer request supplement, then the engineer is requested to enter comments. The cost model is then sent to PACS so that the planner can view the changes. An email is sent to the network planner indicating the overage amount and comments about the work request, work activity model, and cost model. If the network planner agrees with the cost model change, then the network planner selects the cost model submitted by the engineer on the work activity and submits it for fiscal approval. If the network planner wants to create a new cost model version, then the planner can create a new cost model, select the new cost model, and submit the new budget for approval. The network planner should review all work activities under to determine which work activities are responsible for causing the fiscal tolerance violation. Then, the network planner may indicate via email that the work activity has been approved for supplement. The engineer is then notified that it has been approved for the new amount. If the network planner disagrees with the cost model change, then the network planner indicates via email that it has been rejected for supplement, and may further include their comments.

The work activity is then sent to the next approver in the sequence. If the approver rejects the work activity, then they may provide their comments, including their comments for rejecting the work activity. Then work activity is sent to network engineer to review, make corrections, and re-submit for approval. Then the work activity is sent to the other approvers in the sequence until last approval is met. If the cost model is re-approved due to fiscal policy violation, then the new cost model and new cost model distribution by month is sent to the ECP 800. If the cost model changes have not exceeded fiscal policy, then the summary cost information is sent to the ECP 800. The budget allocation information is sent to the accounting department. The work activity new approved dollar amount is saved as the benchmark of fiscal policy limit for the work activity. The approval and all necessary cost model is sent to accounting.

Next, it is determined if the work activity documents need to be redistributed. If the documents do need to be redistributed, then the engineer is prompted to update any necessary documents and redistribute. These documents may include the throw away design, permits, etc. If the redistribution of documents is required, then the system prompts the engineer to update any necessary documents and re-distribute them to the system. The project engineer is prompted to create/distribute new versions of the impacted documents. The new version of the document is uploaded to the repository through the ECP 800. Each document is time stamped with the date that it was uploaded and the version number. The default distribution list is displayed, so that the engineer can add or delete people from the distribution list. The engineer can trigger the system to then distribute the distribution work activity packet and the system then distributes the packets to the selected recipients. A determination is made as to whether an assignment of resources or distribution of tasks. Then, a determination is made as to whether job acceptance is required.

Next, the system determines if an assignment of resources or distribution of tasks is required. If the assignment is not required, then the system automatically re-distributes the task list to both the original and/or revised resources, specifically indicating the change. If the assignment is required, then the construction supervisor triggers the distribution of the revised task list. A default distribution list is provided to initiate the distribution of the task list. This allows the construction supervisor to add or remove individuals from default distribution. Then, the task list is sent to the various resources at the work activity level via the system. If the original task list was not yet sent to the master contractor for acceptance, then the master contractor is prompted to review the revised task list via the ECP 800 due to change requests. A pre-survey may be performed at this time. If any discrepancies or omissions are identified, such as TAD, labor tasks, materials, etc., then the revisions is requested using the change control process as described above. Next, the system determines if the job acceptance is required. If the job acceptance is not required, then the change control is closed after the updated records match between EWO/ECP 800 and other steps for change control have been completed.

When the engineer's organization 120 uses the system to generate an invoice 850 describing the installation of the 2000 feet of cable, this invoice 850 can be submitted to accounts payable and payment sent to the contractor. Because the contractor obtained approval for the CIP 810, the contractor will be paid for installing 2000 feet of cable instead of the 1000 feet of cable as originally designed by the engineer. If the contractor had not received approval for the installation of 2000 feet of cable, e.g., not filed a CIP 810, then the system would generate an invoice 850 for the installation of 1000 feet of cable. As such, the contractor would only be paid for installing the original design amount of 1000 feet of cable instead of the actual amount of 2000 feet. As such, the burden is on the contractor to explain to the engineer's organization 120 the deviation from the original amount of cable. The organization 120 can refuse payment for the installation of the extra 1000 feet of cable or impose an inspection penalty based on, e.g., the failure to file the CIP 810. Thus, this procedure can aid an organization 120 in keeping its inventory data current. In another alternative, the contractor could use the system to generate the invoice and submit for payment.

Figure 6:
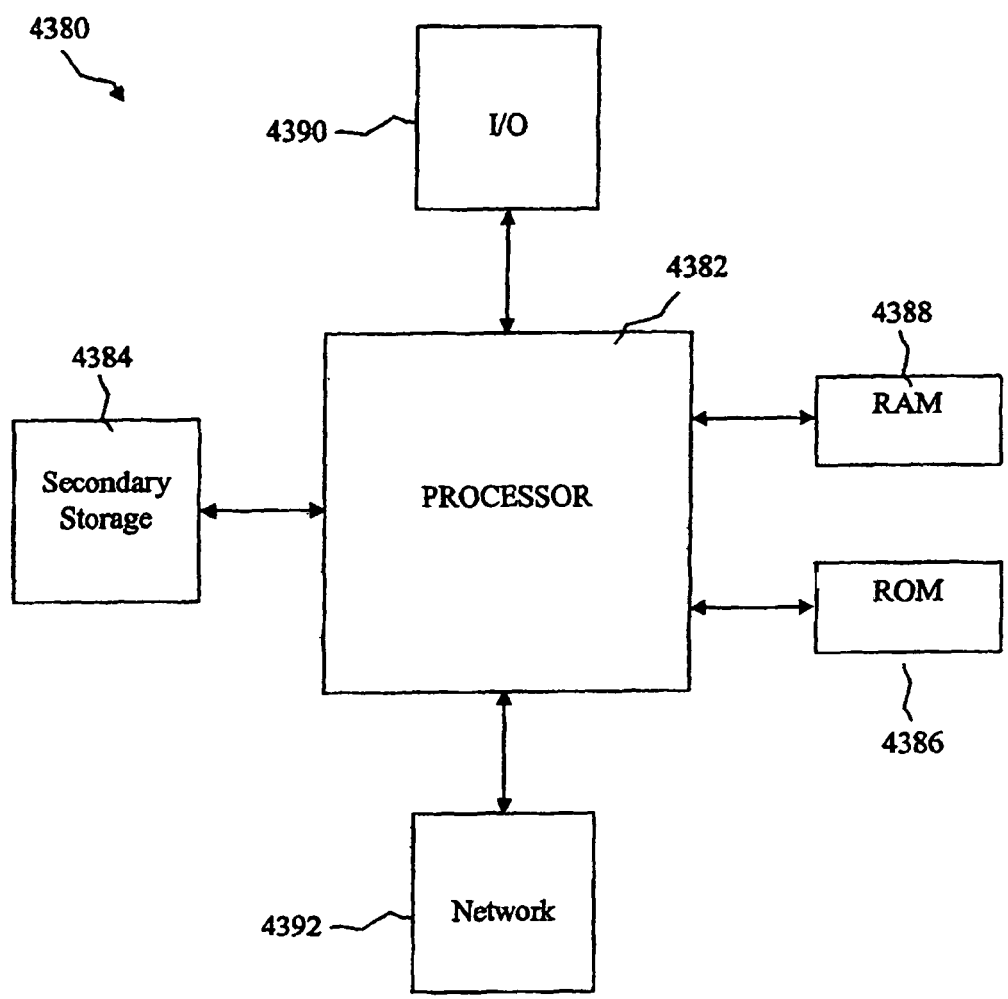
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 4380 includes a processor 4382 (which may be referred to as a central processor unit or CPU) that is in communication with memory devices including the secondary storage 4384, the read only memory (ROM) 4386, the random access memory (RAM) 4388, the input/output (I/O) 4390 devices, and the network connectivity devices 4392. The processor may be implemented as one or more CPU chips.

The secondary storage 4384 is typically comprised of one or more disk drives or tape drives and is used for non-volatile storage of data and as an overflow data storage device if the RAM 4388 is not large enough to hold all working data. The secondary storage 4384 may be used to store programs which are loaded into the RAM 4388 when such programs are selected for execution. The ROM 4386 is used to store instructions and perhaps data which are read during program execution. The ROM 4386 is a non-volatile memory device which typically has a small memory capacity relative to the larger memory capacity of secondary storage. The RAM 4388 is used to store volatile data and perhaps to store instructions. Access to both the ROM 4386 and RAM 4388 is typically faster than to the secondary storage 4384.

The I/O 4390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 4392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 4392 devices may enable the processor 4382 to communicate with an Internet or one or more intranets. With such a network connection, it is contemplated that the processor 4382 might receive information from the network, or might output information to the network in the course of performing the above-described method steps. Such information, which is often represented as a sequence of instructions to be executed using the processor 4382, may be received from and outputted to the network, for example, in the form of a computer data signal embodied in a carrier wave.

Such information, which may include data or instructions to be executed using the processor 4382 for example, may be received from and outputted to the network, for example, in the form of a computer data baseband signal or signal embodied in a carrier wave. The baseband signal or signal embodied in the carrier wave generated by the network connectivity 4392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 4382 executes instructions, codes, computer programs, scripts which it accesses from hard disk, floppy disk, optical disk (these various disk based systems may all be considered the secondary storage 4384), the ROM 4386, the RAM 4388, or the network connectivity devices 4392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for billing a construction activity for a telecommunications company, comprising:

designing a telecommunications construction activity in a first electronic datastore wherein the first electronic datastore comprises one or more tasks and any inventory items to be installed or used in the completion of those tasks;

transmitting the telecommunications construction activity to a second electronic datastore that provides a communication interface for a first entity managing the activity and a second entity completing the one or more tasks to accomplish the activity at a construction site, wherein the communication interface comprises a web-based graphical user interface;

entering into the second electronic datastore by the second entity an amount of completion of the telecommunications construction activity, wherein the amount of completion equals the number of tasks completed for the telecommunications construction activity;

determining, with a processor, whether one or more tasks have been completed by the second entity;

responsive to one or more tasks having been completed by the second entity, communicating, by the second entity, completion of tasks by the second entity to the second electronic data store;

responsive to the second entity having not completed one or more tasks, submitting, by the second entity, a change in plan to the second electronic data store;

determining, with the processor, whether the change in plan falls within a first tolerance range;

responsive to the change in plan falling within the first tolerance range, automatically approving the change in plan and transmitting the change in plan from the second electronic datastore to the first electronic datastore;

responsive to the change in plan not falling within the first tolerance range, not transmitting the change in plan and determining, with the processor, whether the change in plan falls within a second tolerance range;

responsive to the change in plan falling within the second tolerance range, determining, with the processor, whether the change in plan is approved by an engineering supervisor;

responsive to the change in plan being approved, transmitting the change in plan from the second electronic datastore to the first electronic datastore;

responsive to the change in plan not being approved, repeat steps starting from determining, with the processor, whether one or more tasks have been completed by the second entity;

responsive to the change in plan not falling within the second tolerance range, determining, with the processor, whether an individual at a sufficient level of authority has approved the change in plan;

responsive to a determination that the sufficient level of authority has approved the change in plan, transmitting the change in plan from the second electronic datastore to the first electronic datastore;

responsive to a determination that the individual at the sufficient level of authority has not approved the change in plan, repeat steps starting from determining, with the processor, whether one or more tasks have been completed by the second entity;

responsive to transmitting the change in plan, revising the one or more tasks and inventory items of the work activity;

determining, with the processor, whether material requisition is impacted by the change in plan;

responsive to the change in plan impacting material requisition, generating a material requisition reflecting a new material usage;

responsive to communicating completion of tasks by the second entity to the second electronic data store, inspecting said telecommunications construction activity to determine whether all of said one or more tasks are completed;

responsive to a determination that all of said one or more tasks are completed, generating an invoice from the first electronic datastore for the amount of completion of the telecommunications construction activity;

responsive to a determination that all of said one or more tasks are not completed, identifying among said one or more tasks those that are not completed according to said construction activity and communicating said incomplete tasks to said second entity;

determining, with the processor, whether the second entity completing the work activity is part of a billing organization;

responsive to the second entity being part of the billing organization, submitting the invoice to a payroll function at the billing organization;

responsive to the second entity not being part of the billing organization, submitting the invoice to accounts payable at the billing organization;

displaying the one or more tasks and inventory items stored in the first electronic datastore.

2. The method of billing a construction activity of claim 1 wherein the billing is done at predetermined intervals.

3. The method of billing a construction activity of claim 1 further comprising:

reconciling an account and issuing a payment to the second entity.

4. The method of billing a construction activity of claim 1 further comprising:

communicating a change in plan to the second electronic datastore for the telecommunications construction activity.

5. The method of billing a construction activity of claim 1, further comprising:

issuing a penalty credit to said second entity; and responsive to said issuing, automatically performing one or both of billing said second entity for said penalty credit and deducting said penalty credit from a future payment due said second entity.

6. A system for billing a construction activity for a telecommunications company, comprising:

a communication interface for sending and receiving data over a network;

a memory component for storing computer executable instructions;

a processing unit for executing the computer executable instructions to perform the steps of:

designing a telecommunications construction activity in a first electronic datastore wherein the first electronic datastore comprises one or more tasks and any inventory items to be installed or used in the completion of those tasks;

transmitting the telecommunications construction activity to a second electronic datastore that provides a communication interface for a first entity managing the activity and a second entity completing the one or more tasks to accomplish the activity at a construction site, wherein the communication interface comprises a web-based graphical user interface;

entering into the second electronic datastore by the second entity an amount of completion of the telecommunications construction activity, wherein the amount of completion equals the number of tasks completed for the telecommunications construction activity;

determining, with a processor, whether one or more tasks have been completed by the second entity;

responsive to one or more tasks having been completed by the second entity, communicating, by the second entity, completion of tasks by the second entity to the second electronic data store;

responsive to the second entity having not completed one or more tasks, submitting, by the second entity, a change in plan to the second electronic data store;

determining, with the processor, whether the change in plan falls within a first tolerance range;

responsive to the change in plan falling within the first tolerance range, automatically approving the change in plan and transmitting the change in plan from the second electronic datastore to the first electronic datastore;

responsive to the change in plan not falling within the first tolerance range, not transmitting the change in plan and determining, with the processor, whether the change in plan falls within a second tolerance range;

responsive to the change in plan falling within the second tolerance range, determining, with the processor, whether the change in plan is approved by an engineering supervisor;

responsive to the change in plan being approved, transmitting the change in plan from the second electronic datastore to the first electronic datastore;

responsive to the change in plan not being approved, repeat steps starting from determining, with the processor, whether one or more tasks have been completed by the second entity;

responsive to the change in plan not falling within the second tolerance range, determining, with the processor, whether an individual at a sufficient level of authority has approved the change in plan;

responsive to a determination that the sufficient level of authority has approved the change in plan, transmitting the change in plan from the second electronic datastore to the first electronic datastore;

responsive to a determination that the individual at the sufficient level of authority has not approved the change in plan, repeat steps starting from determining, with the processor, whether one or more tasks have been completed by the second entity;

responsive to transmitting the change in plan, revising the one or more tasks and inventory items of the work activity;

determining, with the processor, whether material requisition is impacted by the change in plan;

responsive to the change in plan impacting material requisition, generating a material requisition reflecting a Previously Presented material usage;

responsive to communicating completion of tasks by the second entity to the second electronic data store, inspecting said telecommunications construction activity to determine whether all of said one or more tasks are completed;

responsive to a determination that all of said one or more tasks are completed, generating an invoice from the first electronic datastore for the amount of completion of the telecommunications construction activity;

responsive to a determination that all of said one or more tasks are not completed, identifying among said one or more tasks those that are not completed according to said construction activity and communicating said incomplete tasks to said second entity;

determining, with the processor, whether the second entity completing the work activity is part of a billing organization;

responsive to the second entity being part of the billing organization, submitting the invoice to a payroll function at the billing organization;

responsive to the second entity not being part of the billing organization, submitting the invoice to accounts payable at the billing organization;

displaying the one or more tasks and inventory items stored in the first electronic datastore.

\* \* \* \* \*